United States Patent
Malkin

(10) Patent No.: US 6,278,419 B1
(45) Date of Patent: *Aug. 21, 2001

(54) MOVING DISPLAY

(75) Inventor: Sergay Malkin, Ramat Gan (IL)

(73) Assignee: Light Spin Ltd., Ness Ziona (IL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/883,002

(22) Filed: Jun. 26, 1997

(51) Int. Cl.⁷ ........................................... G09G 3/20
(52) U.S. Cl. ................... 345/31; 345/56; 345/57
(58) Field of Search .................. 345/31, 56, 57, 345/82, 108, 110; 340/815.59, 815.58, 815.64, 815.77, 815.86

(56) References Cited

U.S. PATENT DOCUMENTS

| | | | |
|---|---|---|---|
| 1,711,859 | 5/1929 | Samminiatelli | 416/5 |
| 3,097,261 | 7/1963 | Schopper et al. | 178/6.5 |
| 3,154,636 | 10/1964 | Schwertz | 178/6.5 |
| 3,323,126 | 5/1967 | Malone et al. | 343/112 |
| 3,555,505 | 1/1971 | Srogi | 340/24 |
| 3,899,780 | 8/1975 | Otala | 340/174 |
| 4,160,973 | 7/1979 | Berlin, Jr. | 340/718 |
| 4,573,048 | 2/1986 | Dash | 340/870 |
| 4,607,255 | 8/1986 | Fuchs et al. | 340/755 |
| 4,689,604 | 8/1987 | Sokol | 340/755 |
| 4,692,878 * | 9/1987 | Ciongoli | 345/419 |
| 5,041,947 * | 8/1991 | Yuen et al. | 362/35 |
| 5,057,827 | 10/1991 | Nobile et al. | 340/755 |
| 5,302,965 * | 4/1994 | Belcher et al. | 345/31 |
| 5,406,300 * | 4/1995 | Tokimoto et al. | 345/31 |
| 5,596,340 * | 1/1997 | Otomi | 345/31 |
| 5,670,971 * | 9/1997 | Tokimoto et al. | 345/31 |
| 5,767,822 * | 6/1998 | Hiroshi | 345/46 |
| 5,818,401 * | 10/1998 | Wang | 345/31 |

FOREIGN PATENT DOCUMENTS

| | | |
|---|---|---|
| 0 156 544 | 4/1985 | (EP) . |
| 2 093 617 | 2/1981 | (GB) . |
| 2093617 | 9/1982 | (GB) . |
| 2095068 | 9/1982 | (GB) . |
| 2280059 | 1/1995 | (GB) . |
| 83/02352 | 7/1983 | (WO) . |

* cited by examiner

Primary Examiner—William A. Cuchlinski, Jr.
Assistant Examiner—Marthe Y. Marc-Coleman
(74) Attorney, Agent, or Firm—Mark M. Friedman

(57) ABSTRACT

A display of the type in which a mobile unit moves one or more arrays of light sources repeatedly through a sequence of positions in a display zone to create the illusion of a floating image. According to a first aspect of the invention, each array is provided with a mechanism for sensing when it arrives at each position in the display zone, and each array then is provided with data to display at that position. According to a second aspect of the present invention, the display is provided with a data storage medium that is geometrically congruent with the path along which the arrays move, and the data to be displayed are read from the data storage medium as the mobile unit moves past the data storage medium. In preferred embodiments of the present invention, the path of motion of the arrays is circular; and, within the second aspect of the invention, the data storage medium is a cylindrical medium, for example, a floppy disk or a compact disk.

13 Claims, 6 Drawing Sheets

MOVING DISPLAY

FIELD AND BACKGROUND OF THE INVENTION

The present invention relates to electrical and electronic displays and, more particularly, to a type of display in which a display zone is scanned repeatedly by one or more arrays of lights to create the illusion of an image floating in space.

Displays of this type are known. Illustrative examples include those described by Lock in UK Patent Application No. GB 2 093 617 A and by Belcher et al. in U.S. Pat. No. 5,302,965, both of which are incorporated by reference for all purposes as if fully set forth herein. Generally, these displays consist of a mobile, typically rotating, unit and a stationary unit. For example, in the displays of Lock and Belcher et al., the mobile unit in fact does only rotate with respect to the stationary unit. The mobile unit includes at least one array of light sources, typically light emitting diodes, oriented perpendicularly to the direction of motion of the mobile unit. As the mobile unit moves, the arrays of light sources sweep a path in a display zone. At each of several positions of the arrays within the display zone, different combinations of the light sources are illuminated. This creates the illusion of an image floating in space, with each light source at each position corresponding to one pixel of the image, and one column of pixels being displayed at each position. With appropriate sequencing of the illumination and extinction of the light sources, this image can be animated.

Displays of this kind suffer from two limitations. The first limitation relates to the accuracy with which the light sources can be positioned relative to the desired column positions. In known devices, the positions of the arrays are determined by measuring the position of the mobile unit as a whole, and inferring the positions of the arrays from this single measurement. For example, in one embodiment of Lock's display, the periphery of a slotted disk fixed to the stationary unit is scanned by an optical reading device fixed to the rotating unit to measure the angular position of the rotating unit relative to the stationary unit. The accuracy and stability of the inferred (nominal) positions of the arrays relative to their actual positions then depends on the accurate alignment and mechanical stability of the mobile unit. In principle, only one array needs be used to scan the display zone. In practice, there is a tradeoff between number of arrays, scan speed, and illumination level; and several arrays are needed to achieve an adequate level of illumination and an adequate scan speed. Small inaccuracies in the alignment of the mobile unit, and mechanical instability of the mobile unit, cause the arrays to be in positions other than their nominal positions as the mobile unit move. Because the light sources of the arrays are turned on and off sequentially as though the arrays were in their nominal positions, the resulting image is blurred.

A second limitation of these kinds of arrays relates to the limited amount of data that can be stored on the mobile unit. Typically, the mobile unit stores only as much data as is needed to display a small number of images, with a much larger store of data being stored in the stationary unit. In the display of Belcher et al., for example, data for new images may be transmitted from the stationary unit to the mobile unit, but only at a rate much slower than the rate at which the corresponding signals must be transmitted to the moving arrays. This limits the extent to which these displays may be used to display animated images.

There is thus a widely recognized need for, and it would be highly advantageous to have, a display, of the type in which a display zone is scanned repeatedly by one or more arrays of lights to create the illusion of an image floating in space, in which control signals are transmitted to the arrays according to their actual positions, rather than their nominal positions, and at a rate fast enough to support animation of the floating image.

SUMMARY OF THE INVENTION

According to the present invention there is provided a display of the type in which a plurality of arrays of light sources are moved successively among a plurality of positions in a common plane of motion to perform a repetitive scanning of a display zone, including: (a) a mechanism for providing each array with data to display at each one of the positions when the array has arrived at the each one of the positions; and (b) for each array, a mechanism for detecting an arrival of the array at the each one of the positions.

According to the present invention there is provided a display for displaying an image in a display zone, including: (a) a stationary unit; (b) a mobile unit, including at least one array of light sources, for moving the at least one array of light sources successively among a plurality of positions along a path to perform a repetitive scanning of the display zone; (c) a medium for storing data to be displayed by the at least one array at each of the positions, the medium being geometrically congruent with the path; (d) a mechanism, rigidly attached to the stationary unit, for securing the medium on the stationary unit; and (e) a mechanism, rigidly attached to the mobile unit, for reading the data as the moving unit moves.

According to a first aspect of the present invention, related to a display in which the arrays move among a set of coplanar positions, each array is provided with a mechanism for sensing when it arrives at one of the positions, and the stationary unit is configured to transmit to each array, when it arrives at a certain position, only the data that is to be displayed by the array at that position. In the examples of preferred embodiments described herein, the positions are along the circumference of a circle, although the scope of the present invention includes displays in which the arrays move in any coplanar sequence of array positions. In one embodiment of this aspect of the present invention, the stationary unit is provided with a flat surface bearing a circular pattern of apertures, each aperture corresponding to one sequential position of the arrays, and is also provided with an illumination source on the opposite side of this surface from the mobile unit; and each array is provided with an optical sensor to sense when it transits from one aperture to the next, based on the periodic alternation of the presence and absence of light transmitted through the flat surface. A control system in the stationary unit continuously interrogates the arrays and, upon determining that a given array has arrived at a certain position, transmits to that array the data to be displayed at that position. In another embodiment of this aspect of the present invention, the stationary unit is provided with a circular ensemble of conductive plates, each plate corresponding to one sequential position of the arrays, and is also provided with electrical connections from a memory device to the conductive plates, whereby each conductive plate is provided with electrical signals corresponding to the data to be displayed at the corresponding position. Each array is provided with a pair of parallel conductive plates, disposed so that as that array sweeps past a particular position, the conductive plate of the circular ensemble that corresponds to that position is sandwiched between the parallel plates attached to the array, forming a capacitively coupled link between the memory device and the array, so that the data to be displayed at that position is transmitted to the array.

According to a second aspect of the present invention, in which the arrays move repetitively along a certain path as the mobile unit moves with respect to the stationary unit, the stationary unit includes a mechanism for holding a data storage medium, such as a magnetic storage medium, that is geometrically congruent with the path followed by the arrays, and the mobile unit includes a mechanism, such as a magnetic read head, for reading the data stored on the data storage medium as the mobile unit moves past the data storage medium. The scope of the present invention includes all such paths, with geometric congruence being established by the use of flexible magnetic tape, shaped to follow the path, as the data storage medium. For example, if the mobile unit moves the arrays back and forth along a linear path, the magnetic tape is stretched out parallel to the path. Nevertheless, in the preferred embodiment of this aspect of the present invention, the path is circular, the mobile unit rotates on an axis relative to the stationary unit, and the data storage medium is cylindrical, for example, a floppy disk, and is secured on the stationary unit concentric with the axis of rotation. With an appropriate ordering of the data on a cylindrical storage medium, as described below, data to be displayed by each array at each position may be transferred to that array in real time, allowing the arrays to have direct access to the full data set to be displayed.

It will be appreciated that, within the preferred embodiment of the second aspect of the present invention, the cylindrical data storage medium need not be magnetic. For example, the data storage medium may be a compact disk, read by an optical read head in the mobile unit.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a display, of the type that creates the illusion of an image floating in space, in which the arrays that create the illusion are provided with display data in a manner that eliminates the blurring of the image and that enables full animation of the image.

The principles and operation of a display according to the present invention may be better understood with reference to the drawings and the accompanying description.

Figure 1:
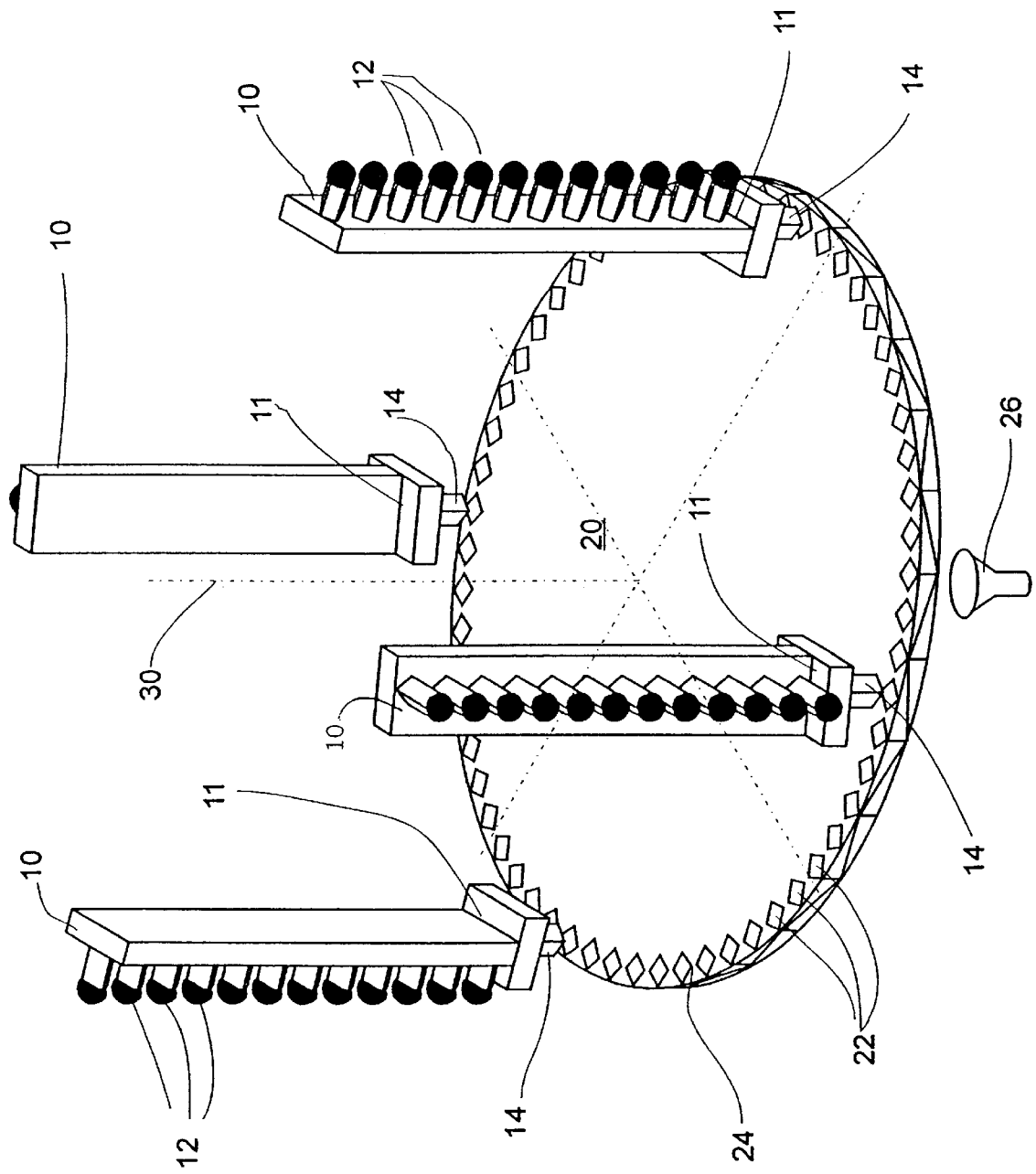
FIG. 1 is a partial perspective view of a first embodiment of the present invention.

Referring now to the drawings, FIG. 1 is a partial perspective view of a first preferred embodiment of the present invention. In this embodiment, the stationary unit includes an opaque barrier 20 coextensive with one surface thereof, and the mobile unit, which rotates at a uniform angular velocity about an axis 30 relative to the stationary unit, includes four linear arrays 10 of light emitting diodes (LEDs) 12. As the mobile unit rotates, ends 11 of arrays 12 move in a circular path that is slightly displaced from and parallel to barrier 20. The stationary unit also includes an illumination source 26 on the side of barrier 20 opposite the mobile unit. Barrier 20 includes a plurality of evenly spaced apertures 22 arrayed in a circle that is directly opposite to the circular path of motion of ends 11 of arrays 12, at positions corresponding to the pixel columns of the floating images displayed by means of LEDs 12. Between one pair of evenly spaced apertures 22 is an initial position aperture 24. Each array 12 includes an optical sensor 14 on end 11 thereof. Optical sensors 14 are used to detect light from source 26 that traverses barrier 20 via apertures 22 and 24 to indicate to each array 12 the arrival of array 12 at a position opposite each of apertures 22 and 24.

Note that only the parts of this embodiment that are relevant to a description of the present invention are shown in FIG. 1. So, for example, the mechanism for rotating the mobile unit at a uniform angular velocity about axis 30 relative to the stationary unit is not shown. The mechanisms taught by Lock and by Belcher et al. are readily adapted to this purpose by one ordinarily skilled in the art. If the mechanism taught by Lock is used, then opaque barrier 20 forms the upper surface of the stationary unit.

It will be appreciated that the principle upon which the embodiment of FIG. 1 is based is the discrete illumination, along a surface of the stationary unit, of positions along the path followed by arrays 12 that correspond to the pixel columns of the images to be displayed. So, for example, instead of source 26 and apertures 22 and 24, the stationary unit may include a circular ensemble of LEDs in the surface thereof past which ends 11 of arrays 12 move.

Figure 2:
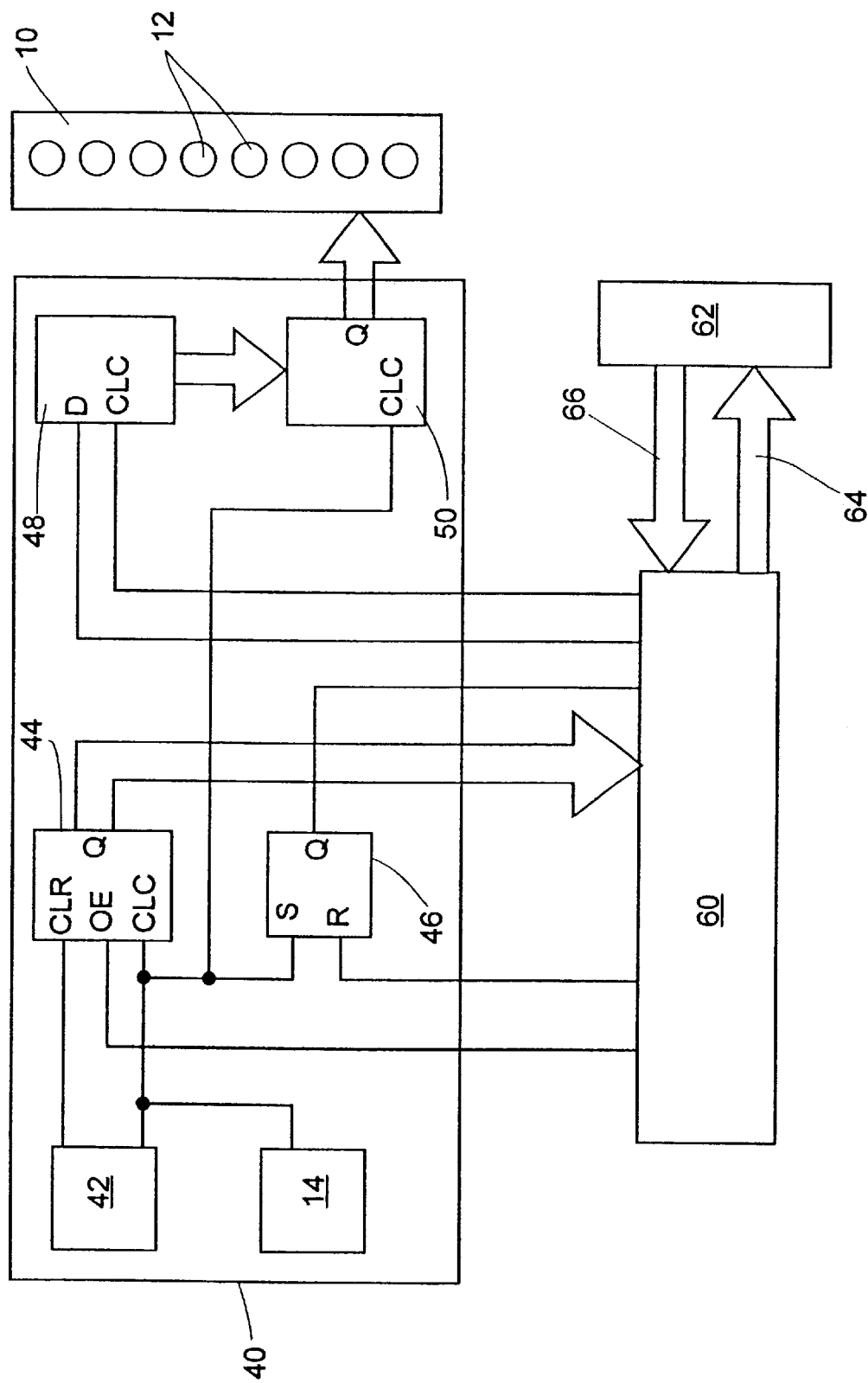
FIG. 2 is a schematic block diagram of the electronic circuitry of the embodiment of FIG. 1.

FIG. 2 is a schematic block diagram of the electronic circuitry that drives arrays 10, under the control of a microprocessor-based control unit 60. Data corresponding to the images to be displayed is stored in a memory unit 62. Control unit 60 addresses this data via an address bus 64. The addressed is provided to control unit 60 via a data bus 66. Control unit 60 and memory 62 are located in the stationary unit.

The mobile unit includes, for each array 10, a corresponding control module 40. Control module 40 includes a pulse selector 42, a counter 44, a flip flop 46, a shift register 48 and a register driver 50. Communication links between control modules 40 and control unit 60, symbolized in FIG. 2 by the vertical lines and the vertical double arrow that connect control unit 60 and control module 40, are provided as taught by Lock and by Belcher et al. For clarity, only one control module 40 is shown in FIG. 2.

Whenever sensor 14 arrives opposite aperture 22 or 24, light traversing barrier 20 via aperture 22 or 24 causes an electrical pulse to be sent to counter 44. Pulse selector 42 distinguishes a pulse due to an arrival of sensor 14 opposite aperture 24 from pulses due to arrivals of sensor 14 opposite apertures 22, on the basis of the time interval between a pulse due to an arrival of sensor 14 opposite aperture 24 and the immediately preceding pulse being half of the time interval between arrivals of sensor 14 opposite adjacent apertures 22. Upon detecting a pulse due to an arrival of sensor 14 opposite aperture 24, pulse selector 42 resets counter 44 to the initial state thereof. Upon detecting a pulse due to an arrival of sensor 14 opposite one of apertures 22, pulse selector 42 increases the count stored in counter 44 by one unit. Thus, the angular position of array 10 relative to the stationary unit is indicated by the state of counter 44. Each electrical pulse from sensor 14 also sets flip flop 46 to the active state thereof and causes data transfer from shift register 48 to register driver 50 which drives LEDs 12 of array 10.

Periodically, at a rate higher (typically twice as high) than the time interval between arrivals of sensors 14 at adjacent apertures 22, control unit 60 interrogates flip flop 46. If flip flop 46 is in its active state, control unit 60 reads the state of counter 44 to determine the angular position of array 10. Control unit 60 then reads data corresponding to that angular position from memory 62, transfers these data to shift register 48, and resets flip flop 46.

Figure 3:
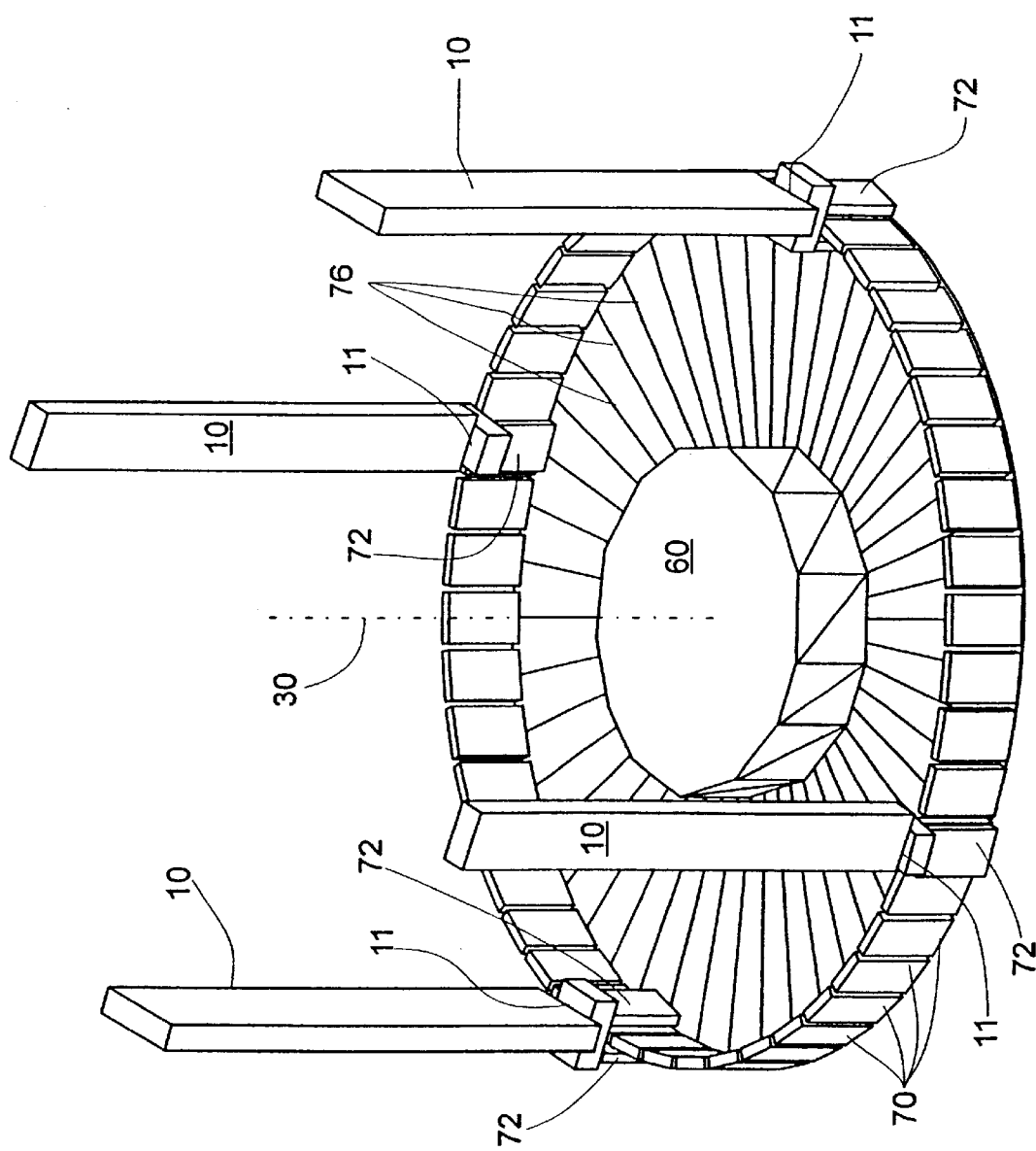
FIG. 3 is a partial perspective view of a second embodiment of the present invention.

FIG. 3 is a partial perspective view of a second embodiment of the present invention. In this embodiment, the surface of the stationary unit, past which the mobile unit rotates about axis 30, is provided with a circular ensemble of conductive plates 70. Each plate 70 is located at a point corresponding to a pixel column of the images to be displayed. Each array 10 is provided, at end 11 thereof, with a pair of conductive plates 72 that straddle conductive plates 70, providing, at each conductive plate 70 so straddled, a capacitive link between array 10 and the stationary unit. Each conductive plate 70 is connected by a wire 76 to control unit 60, whereby control unit 60 transmits to each conductive plate 70 only data to be displayed in the corresponding column of image pixels.

Figure 4:
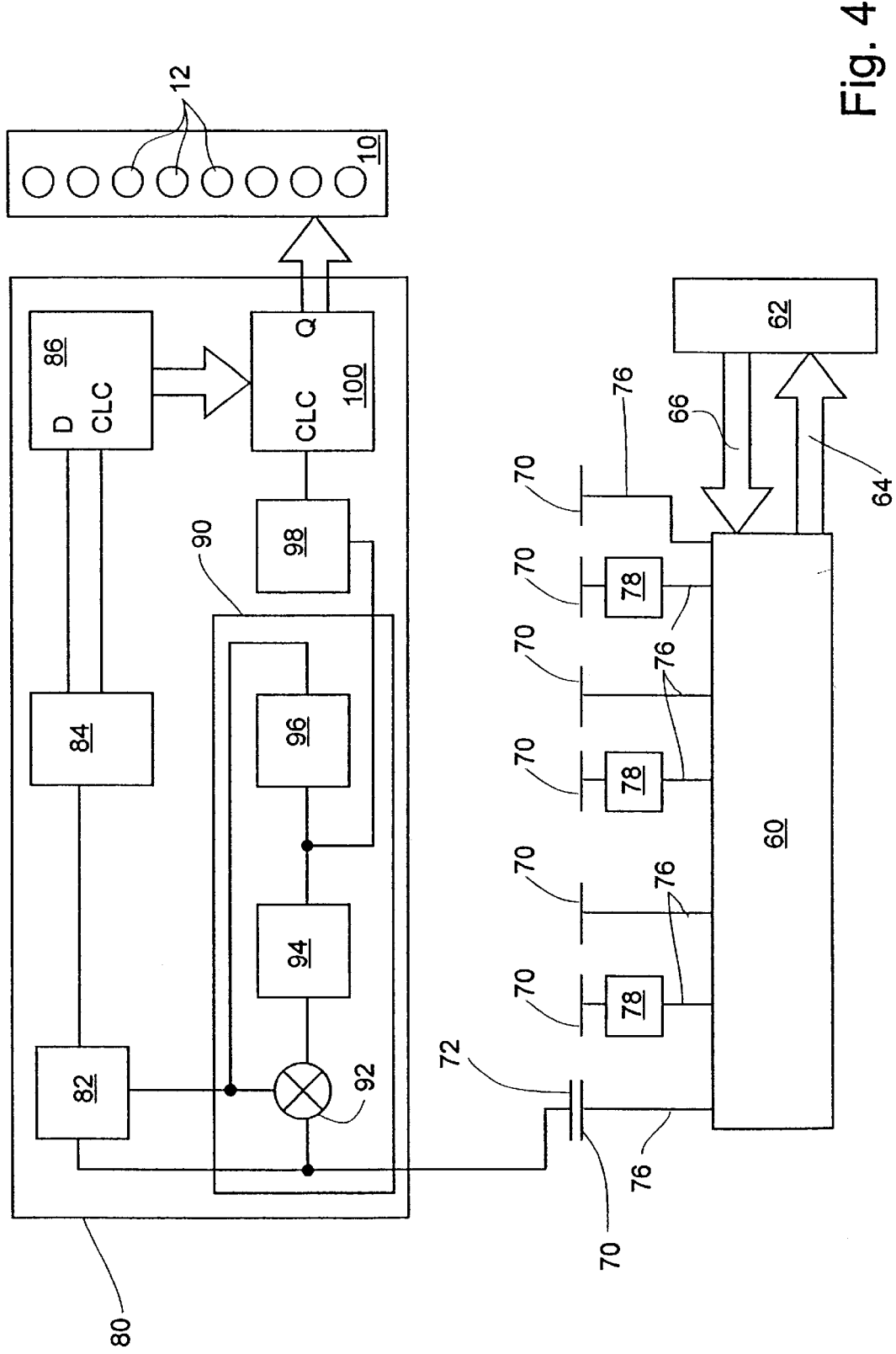
FIG. 4 is a schematic block diagram of the electronic circuitry of the embodiment of FIG. 3.

FIG. 4 is a schematic block diagram of the electronic circuitry that drives arrays 10 in the embodiment of FIG. 3, again under the control of control unit 60 in the stationary unit. There are an even number of conductive plates 70, each conductive plate 70 being connected to control unit 60 by wires 76. Alternate conductive plates 70 are connected to control unit 60 via inverters 78. For clarity, only 7 conductive plates 70 are shown in FIG. 4.

The mobile unit includes, for each array 10, a corresponding control module 80, for receiving signals through the capacitively coupled links between conductive plates 70 and 72. Control module 80 includes a demodulator 82, a data packet detector 84, a shift register 86, a phase lock loop 90, a pulse shaper 98 and a register driver 100. Phase lock loop 90 in turn includes a phase detector 92, a low pass filter 94 and a voltage controlled oscillator 96. For clarity, only one mobile unit 80 is shown in FIG. 4.

Control unit 60 transmits data to conductive plates 70 as a modulated carrier wave. Every other conductive plate 70 receives this modulated carrier wave, via inverter 78, as an inverted wave. The modulated carrier wave is transmitted, via the capacitively coupled link between conductive plates 70 and 72, to demodulator 82 and phase lock loop 90. Phase lock loop 90 supplies demodulator 82 with a signal identical to the carrier wave, except for being 90° out of phase with the carrier wave. The reperence signal leads uninverted modulated signals (signals that do not traverse one of inverters 78) by 90° and lags inverted modulated signals (signals that do traverse one of inverters 78) by 90°. Demodulator 82 uses the reference signal from phase lock loop 90 to recover the data from the modulated signals and pass the data on to data packet detector 84.

Data are transmitted in packets, with each packet including a preamble, a postamble, and, between the preamble and the postamble, bits corresponding to the sequence of LEDs 12 to be turned on and off at the angular position of each conductive plate 70. Several (preferably at least three) packets are transmitted in the time that it takes for an array 10 to sweep past one conductive plate 70, so that the transmission of data to arrays 10 need not be exactly synchronized with the angular positions of arrays 10. When data packet detector 84 detects the arrival of a complete packet, including the preamble and the postamble, data packet detector 84 strips the preamble and the postamble from the packet and passes on the data to shift register 86, along with a synchronization signal.

The output of low pass filter 94, in addition to being passed to voltage controlled oscillator 96, is passed to pulse shaper 98. Whenever a capacitively coupled link is broken with one conductive plate 70 and established with the next conductive plate 70, the polarity of the output of low pass filter 94 changes. Pulse shaper 98 transforms this polarity change to a pulse, which triggers register driver 100 to write the data stored in shift register 86 to array 10.

The capacitive communications link described herein for transmitting data from control unit 60 to arrays 10, including wires 76 and conductive plates 70 and 72, is one illustrative example of a multichannel communications link between control unit 60 and arrays 10. The scope of the present invention includes all equivalent links, for example, optical links and magnetic induction links.

In both the first embodiment and the second embodiment, typical rotational speeds range from 100 rpm to 900 rpm, and the number of pixel columns in the image typically range between 64 and 512. Thus, in the first embodiment, typically there are between 64 and 512 apertures 22 in opaque barrier 20, and in the second embodiment, typically there are between 64 and 512 conductive plates 70.

Figure 5:
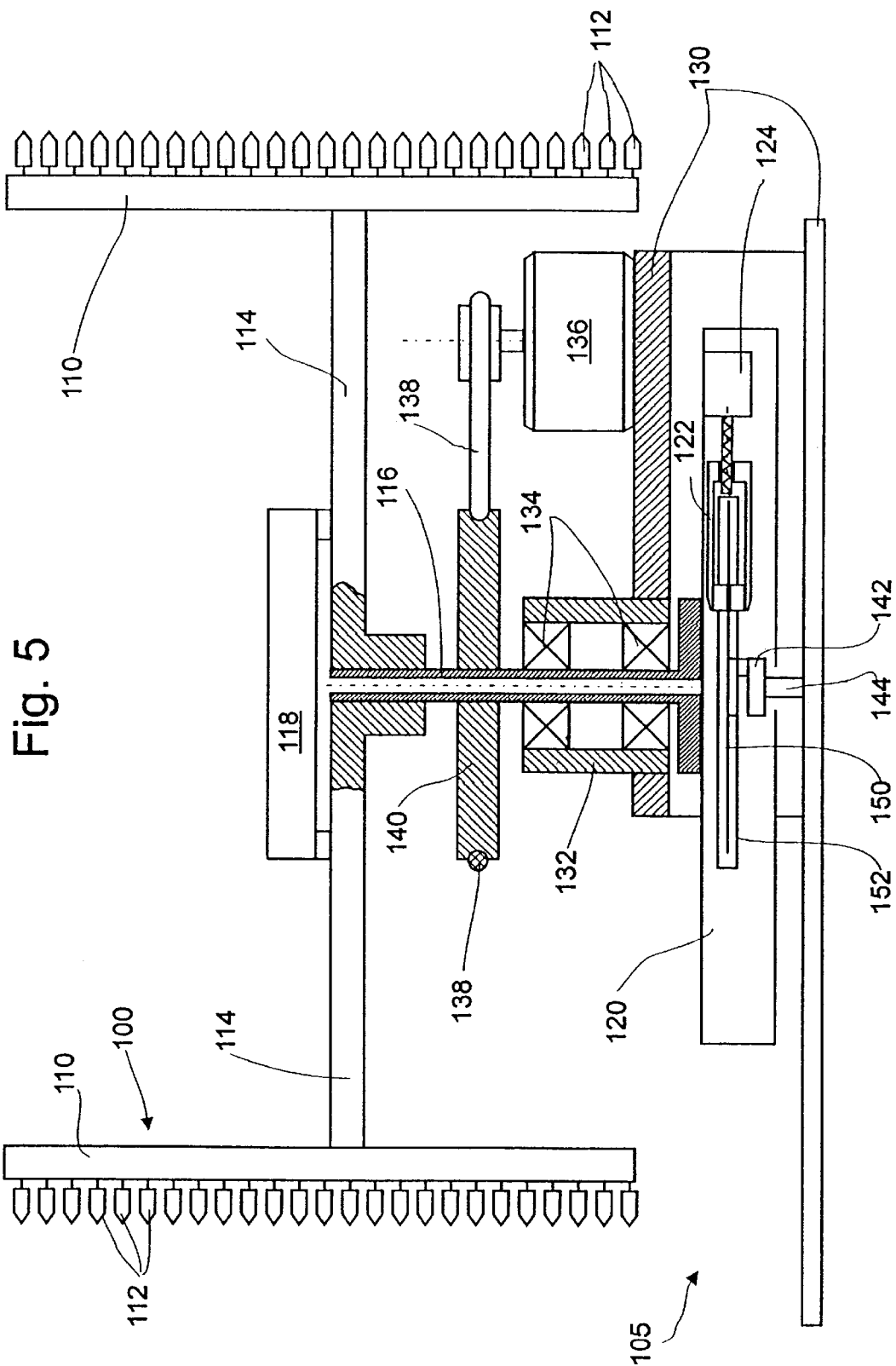
FIG. 5 is a vertical cross section of a third embodiment of the present invention.

FIG. 5 is a vertical cross section through a third embodiment of the present invention, illustrating the second aspect of the present invention. In this embodiment, a mobile unit 100 includes two linear arrays 110 of LEDs 112 at the ends of oppositely directed arms 114 that extend from a central hollow cylindrical shaft 116. Mounted above shaft 116 is a control unit 118. To the end of shaft 116 opposite arms 114 is rigidly attached a floppy disk drive 120 that includes a magnetic read head 122, a radial positioning drive 124, and other standard components not shown in FIG. 5. An electrical connection (not shown) is provided between control unit 118 and disk drive 120 through the hollow interior of shaft 116. This embodiment also includes a stationary unit 105, which includes a sleeve 132, that is mounted on a base 130, and that contains bearings 134 within which shaft 116 is rotatably mounted. Stationary unit 105 also includes a motor 136, mounted on base 130, that drives the rotation of shaft 116 by means of a drive belt 138 and a pulley 140.

A floppy disk 150, within a floppy disk case 152, is mounted within disk drive 120 and held stationary therein by a pressure unit 142 mounted on spindle 144 that is attached to base 130 concentric with shaft 116. As the mobile unit, including disk drive 120, rotates, pressure unit 142 holds floppy disk 150 stationary. Thus, the reading of floppy disk 150 is accomplished in a manner opposite to the conventional manner. Instead of floppy disk 150 rotating within case 152 and disk drive 120, floppy disk 150 remains stationary, while disk drive 120 and case 152 rotate around floppy disk 150.

Figure 6:
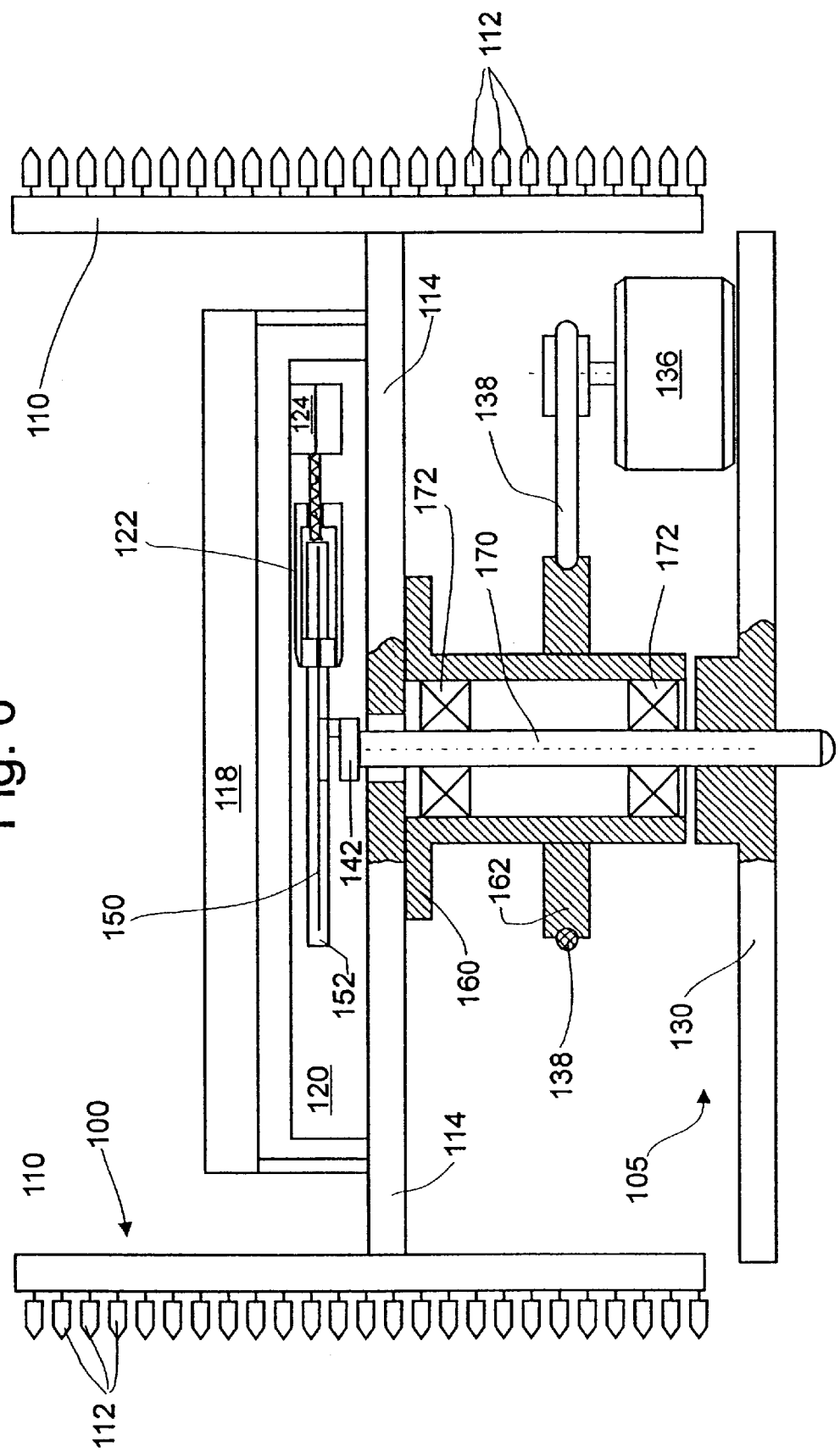
FIG. 6 is a vertical cross section of a fourth embodiment of the present invention.

FIG. 6 is a vertical cross section through a fourth embodiment of the present invention, also illustrating the second aspect of the present invention. The embodiments of FIGS. 5 and 6 share most of their components, and components so shared are designated by identical reference numerals in FIGS. 5 and 6. In the embodiment of FIG. 6, mobile unit 100 includes a central hollow cylindrical sleeve 160 on top of which are mounted both disk drive 120 and control unit 118. Stationary unit 105 includes a solid central shaft 170 about which sleeve 160 is rotatably mounted on bearings 172. Motor 136 drives the rotation of sleeve 160 by means of drive belt 138 and a pulley 162. Pressure unit 142 that holds floppy disk 150 in place is mounted on top of shaft 170. Otherwise, the embodiment of FIG. 6 is structurally and functionally identical to the embodiment of FIG. 5.

To maximize the speed at which data are read from floppy disk 150, the data to be displayed in successive pixel columns are interleaved. For example, if L linear arrays are used to display N pixel columns, with N being an integral multiple of L, the order of data storage is:

column 1 column N/L+1 column 2N/L+1 . . . column N−N/L+1
column 2 column N/L+2 column 2N/L+2 . . . column N−N/L+2
column N/L column 2N/L column 3N/L . . . column N For example, in an embodiment, such as those of FIGS. 5 and 6, that has 2 linear arrays 110 of LEDs 112, if the image to be displayed has 64 columns, then the columns are stored in the order 1, 33, 2, 34, 3, 35, . . . , 31, 63, 32, 64. The first two columns read from floppy disk 150 then are columns 1 and 33, which are in fact the first two columns to be displayed, because when one linear array 110 is at a position corresponding to pixel column 1, the other linear array 110 is diametrically opposite the first linear array 110, at a position corresponding to pixel column 33. It will be readily apparent, to one ordinarily skilled in the art, how to synchronize the reading of floppy disk 150 with the display of data on linear arrays 110 at the various positions thereof.

As noted above, the cylindrical data storage medium of the preferred embodiment of the second aspect of the present invention may be an optical storage medium such as a compact disk. FIGS. 5 and 6 also may be understood to represent this variant of the present invention, with reference numeral 150 designating a compact disk, reference numeral 120 designating a compact disk drive, and reference numeral 122 designating an optical read head.

While the invention has been described with respect to a limited number of embodiments, it will be appreciated that many variations, modifications and other applications of the invention may be made.

What is claimed is:

1. A display of the type in which a plurality of arrays of light sources are moved in a rotational manner among a plurality of positions to perform a repetitive scanning of a display zone, comprising:
    (a) a memory unit for storing data to be displayed;
    (b) for each array, a respective control module for providing said each array with a respective portion of said data to be displayed at each one of the positions when said each array has arrived at said each one of the positions;
    (c) a control unit for transferring said data from said memory unit to said control modules; and
    (d) for each light source array, an optical sensor for detecting an arrival of the array at said each one of the positions.

2. The display of claim 1, wherein said mechanism for detecting said arrival of the array at said each one of the positions includes a multi-state device, each of the positions corresponding to a different state of said multi-state device.

3. The display of claim 2, wherein said multi-state device includes a counter.

4. The display of claim 1, wherein said mechanism for detecting said arrival of the array at said each one of the positions includes a two-state device.

5. The display of claim 1, wherein said two-state device includes a flip flop.

6. The display of claim 1, further comprising:
    (c) a plurality of coplanar indicators, each of said indicators corresponding to one of the positions;

and wherein said mechanism for detecting said arrival of the array at said each one of the positions includes a sensor responsive to said indicators.

7. The display of claim 6, wherein said sensor is an optical sensor.

8. The display of claim 7, further comprising:
    (d) a source of illumination; and
    (e) an opaque barrier, substantially coplanar with the positions, between said source of illumination and the arrays;

and wherein each of said coplanar indicators includes an aperture, transmissive of said illumination, in said opaque barrier.

9. The display of claim 1, wherein said mechanism for providing each array with data to display at each one of the positions includes a multichannel communications link.

10. The display of claim 9, wherein said multichannel communications link transmits said data as a modulated carrier wave signal, wherein, for any pair of positions occupied successively by any one of the arrays, said signal corresponding to a second position of said pair of positions is inverted with respect to said signal corresponding to a first position of said pair of positions.

11. The display of claim 10, wherein said mechanism for detecting said arrival of the array at said each one of the positions includes a mechanism for recognizing said inverted signals.

12. The display of claim 11, wherein said mechanism for recognizing said inverted signals includes a phase lock loop.

13. The display of claim 9, wherein said multichannel communications link includes:
    (i) a plurality of coplanar conductive plates, each of said coplanar plates corresponding to one of the positions; and
    (ii) on each of the arrays, at least one conductive plate, disposed so that when the array is at any one of the positions, said coplanar conductive plate corresponding to said one position is adjacent to said conductive plate of the array, thereby establishing a capacitive communications link.

* * * * *